Aug. 6, 1957 P. E. OHMART 2,802,113
APPARATUS FOR MEASURING EXPOSURE TO RADIANT ENERGY
Filed April 17, 1952
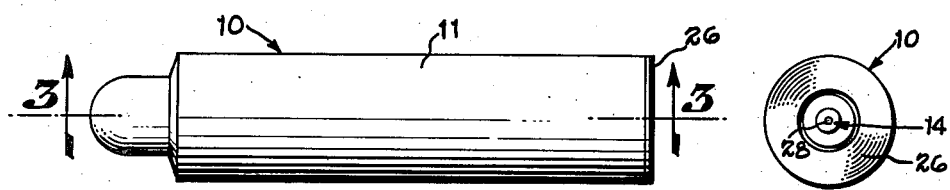
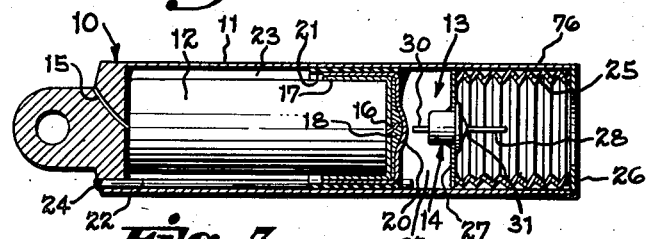
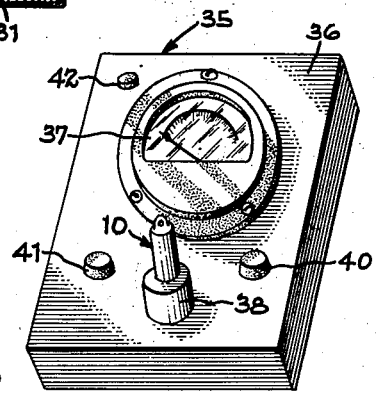
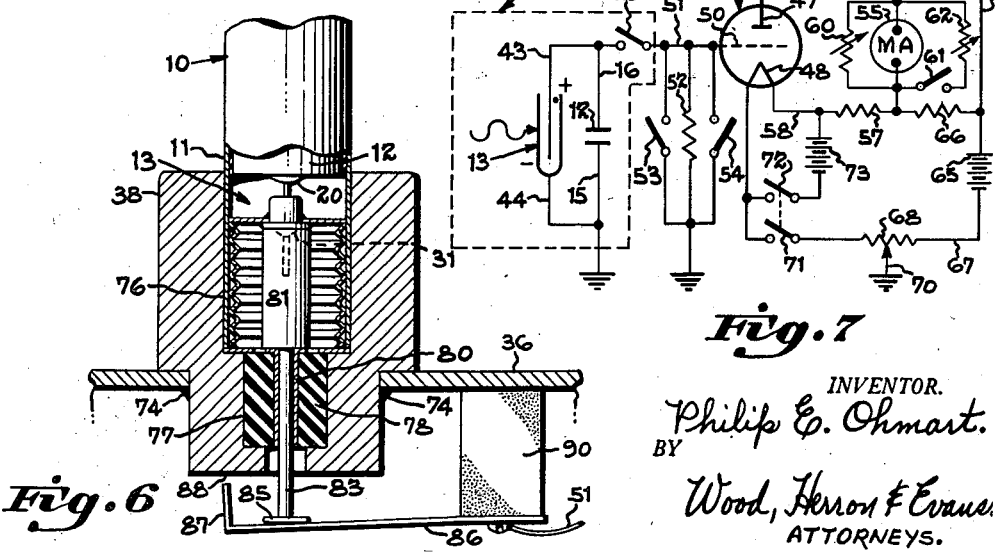
INVENTOR.
Philip E. Ohmart.
BY
Wood, Herron & Evans.
ATTORNEYS.

United States Patent Office 2,802,113
Patented Aug. 6, 1957

2,802,113

APPARATUS FOR MEASURING EXPOSURE TO RADIANT ENERGY

Philip Edwin Ohmart, Cincinnati, Ohio, assignor to The Ohmart Corporation, Cincinnati, Ohio, a corporation of Ohio Application April 17, 1952, Serial No. 282,880

14 Claims. (Cl. 250—83.6)

This invention relates to apparatus for measuring radiant energy and is particularly directed to a novel personal dosimeter and a novel device for reading the dosimeter to determine the amount of radiation to which an individual has been exposed.

Heretofore it has been the practice to measure the amount of radiation from radioactive material, X-ray machines or other sources for dosimetry purposes by means of ionization chambers. An ionization chamber includes two electrodes which function as a capacitor capable of holding an electric charge and a gas in contact with the electrodes. Upon exposure to radiation, the charge upon the electrodes is dissipated due to the ionization of the gas between the electrodes which creates an internal leakage path and permits neutralization of the charge.

When employing an ionization chamber as a personal dosimeter, it is initially charged to a predetermined potential, often as high as several hundred volts. When the chamber is exposed to radiation, such as might be present in a plant handling radioactive material, the gas within the chamber is ionized to an extent dependent upon the quantity of radiation present, resulting in a proportional dissipation of the original charge. To determine the amount of radiation to which the chamber has been exposed, the residual charge is measured by means of a specially calibrated instrument.

There are several disadvantages attendant the use of an ionization chamber as a personal dosimeter. In the first place, the chamber must be accurately charged and must be used within a relatively short time after the charge has been placed upon its electrodes or the charge will be dissipated, even without exposure to radiation. Consequently if an ionization chamber is stored for any appreciable time it must be recharged, or the determinations of exposure made from it will be so inaccurate as to be practically worthless. Furthermore, a workman using an ionization chamber carries around a device which is charged to several hundred volts. The tendency of this potential to discharge is great and the rough usage to which a workman is likely to subject the device is apt to cause a voltage leak to develop through damage to insulation or through some similar cause. Moreover, such extraneous and uncontrollable factors as humidity and dust accumulation greatly affect the rate of discharge and consequently introduce appreciable errors into the measurements of exposure.

The present invention is predicated upon the concept of providing a radiation measuring device which generates a current when exposed to radiation, and thus builds up a charge, furnishing an accurate index of the total amount of radiation to which the dosimeter has been subjected. One of the principal advantages of such a dosimeter is that it requires no initial charge from an external voltage source. Hence, it may be stored for an indefinite period of time before use, and after it has once been read, it may be reconditioned for further use by simply shortcircuiting it.

A dosimeter of this type greatly simplifies the monitoring problem for laboratories, factories, defense agencies and the like. A plant handling radioactive material, for example, may store a large number of dosimeters until they are needed and then may distribute them among their employees. Each individual likely to be subjected to radiation of dangerous magnitude can be given a dosimeter to carry with him. Nothing need be done to the dosimeter before use, although in some cases to insure absolute accuracy, it may be desirable to shortcircuit it to remove any stray charges. At the end of a predetermined period, a day or week for example, the charge developed by the dosimeter is measured to determine the total amount of radiation to which the employee has been subjected during the period. After it has been read, the dosimeter can be conditioned for further use by again shortcircuiting it. Shortcircuiting may be accomplished by any of a number of simple expedients, so that even unskilled employees can ready their own dosimeter for use. This is in sharp contrast with the relatively complex devices needed to apply a precise charge to an ionization chamber in order to ready it for use.

Another advantage of the present type of dosimeter is that the maximum potential which it develops never exceeds a few volts. This greatly simplifies the leakage problem since the tendency of the charge to dissipate is considerably less than is the case when a several hundred volt potential is involved. Not only does the decreased leakage result in greater accuracy, but also the insulation may be of a more simple nature, facilitating the construction of a compact unit. Furthermore, dosimeters of the present invention are much more rugged and are less likely to be damaged or rendered inaccurate by rough usage.

Basically, a personal dosimeter constructed in accordance with this invention includes an Ohmart cell, or radiant energy electric generator, having in its external circuit a capacitor for storing the charge produced by the cell, and a contact member providing an electrical connection to the capacitor. Essentially an Ohmart cell comprises three elements; a first electrode, a second electrode, chemically dissimilar to the first and electrically insulated from it, and an ionizable gas in contact with the two. As explained in my copending applications, "Radio Electric Generator," Serial No. 233,718, filed June 27, 1951, "Ohmart Cells For Measuring Radiation," Serial No. 259,341, filed December 1, 1951, and "Method Of Converting Ionic Energy Into Electrical Energy," Serial No. 266,883, filed January 17, 1952, I have discovered that if two chemically dissimilar materials are immersed in a plasma of ions, a current will flow through an external leakage path connecting the electrodes. The phenomena by which the current is produced in an Ohmart cell is explained more fully in my copending applications. It will suffice here to state that when two chemically asymmetric electrodes are immersed in a plasma of ions there is a discriminatory migration of the ions toward the electrodes, due to the field bias existing between them. This discriminatory migration will result in a potential being developed between the electrodes and in a current flow in any external leakage path connecting them. The amount of current flowing through the external path, all other factors remaining constant, varies with the amount of radiation impinging upon the cell.

In the personal dosimeter herein disclosed, the external leakage path includes a capacitor so that the current generated by the Ohmart cell is effective to charge up the capacitor which is thus driven to a potential dependent upon the total amount of current produced by the cell. Since the total amount of current flowing into the capacitor is dependent upon the total quantity of radiation to which the cell has been subjected, the potential of the capacitor serves as an accurate index of this latter quantity, and by measuring the capacitor potential on a properly calibrated instrument, the amount of radiation may be visually observed.

One of the principal objects of this invention is to provide a dosimeter in which the potential of the capacitor can be quickly and easily measured, but which will be highly resistant to accidental discharge. To achieve this result I have provided an elongate casing in which the capacitor and Ohmart cell are mounted. One end of the casing is sealed and the other end is fitted with a Sylphon bellows or similar expandable element. The inner end of the bellows is closed and supports an insulated contact member. The bellows normally support the contact member in a position spaced from contact with the capacitor but can be expanded so that the contact member is brought into electrical connection with the capacitor. The capacitor cannot be short-circuited unless a piece of metal engages both the contact member and dosimeter casing and simultaneously sufficient force is applied to the bellows to force the conductor into engagement with the capacitor lead.

In the preferred embodiment, the bellows also function to seal the end of the casing to contain the filling gas within the Ohmart cell. Preferably the casing extends a substantial distance beyond the outer end of the contact member not only to lessen the likelihood of that member's being accidentally depressed, but also to provide an aligning surface, or skirt, which can be inserted into the well of a reading instrument to align the dosimeter for engagement with a plunger adapted to engage the recessed contact member. In other words, the skirt prevents the dosimeter from being angularly misaligned with the plunger so that the plunger cannot engage both the casing and the contact member causing a short circuit.

A further advantage of the elongate cylinder is that the bellows and insulated contact members are disposed entirely within the casing and are thus protected from the effects of handling. Thus, the need for a cap or other protective device to cover the bellows and contact member is eliminated. Since a cap is easily misplaced and its removal slows down the reading procedure this feature is especially advantageous where large numbers of dosimeters are employed.

Another important object of this invention is to provide a reading device which is simple to operate and which facilitates the accurate and simple measurement of the potential of the dosimeter capacitor. Preferably the reading instrument contains a large visible dial which is calibrated in terms of Roentgens or similar units so that when a dosimeter is inserted, the amount of radiation to which it has been exposed can be directly observed. One of the novel features of the reading instrument is the dosimeter receiving well. The well includes a guiding surface for aligning the dosimeter and a movable plunger for engaging the dosimeter contact member. Upon insertion of the dosimeter into the well, its contact member is initially grounded to remove any stray electrostatic charges, and then is disconnected from ground and brought into engagement with the positive lead of the capacitor and a lead of the potential measuring instrument.

In the preferred embodiment, the plunger is reciprocally mounted in the bottom of the well and is electrically insulated therefrom. The plunger is spring urged upwardly and is electrically connected to the voltage measuring instrument. Associated with the plunger is a switch which normally grounds the plunger preventing it from picking up a stray charge. The switch is arranged so that it opens before the plunger is completely depressed by the dosimeter. The relative strength of the spring loading the plunger and the bellows must be such that before the bellows expand enough to bring the contact member into engagement with the capacitor, the plunger is depressed sufficiently to open the shortcircuiting switch.

Another object of this invention is to provide a reading device having two ranges of indication. The reading device is operated in one range for making accurate measurements of exposure of dosimeters which have been subjected to normal amounts of radiation, less than 200 milli-Roentgens for example. The second range is a broad reading range for use with similar dosimeters when they have been subjected to unusual large amounts of radiation, as for example that accompanying an atomic explosion. Thus, if an individual inserts a dosimeter into the reading device and observes more than a full scale deflection, indicating exposure to excessive amount of radiation, the exact amount may be determined by manipulating a range switch changing the characteristics of the potential measuring instrument so that it will no longer give a full scale deflection and the amount of radiation to which the dosimeter has been exposed may be observed on a second scale.

A further object of this invention is to provide a reading instrument in which the dosimeter capacitor can be shortcircuited without removing the dosimeter from the reading instrument. Preferably, after a reading has been made, the dosimeter is kept within the well and a button is pressed to activate a circuit for shorting the capacitor. Thus, an employee can read his dosimeter and at the same time recondition it for use during an ensuing period. A single reading device can thus be utilized by a large number of employees, each employee slipping his dosimeter into the well and noting the dial indication and then pressing the discharge button to condition the dosimeter for further use.

These and other objects and advantages of my invention will be apparent from a consideration of the following detailed description of the drawings.

In the drawings:

Figure 1 is a front elevational view of a dosimeter constructed in accordance with the present invention.

Figure 2 is an end view of the dosimeter shown in Figure 1.

Figure 3 is a cross sectional view taken along line 3—3 of Figure 1.

Figure 4 is a perspective view of a dosimeter reading device.

Figure 5 is a longitudinal cross sectional view of the dosimeter receiving well of the reading device shown in Figure 4.

Figure 6 is a view similar to Figure 5 showing the manner in which a dosimeter is inserted into the well for reading.

Figure 7 is a circuit diagram of a dosimeter and a reading device.

One preferred embodiment of a dosimeter constructed in accordance with this invention is shown in Figures 1, 2 and 3. The dosimeter, indicated generally at 10, includes a casing 11, a capacitor 12, an Ohmart cell, or radiant energy electric generator 13, and a movable contact 14. The casing is preferably constructed of a metal such as brass or aluminum or a plastic material which is adapted to sustain rough usage without deforming or cracking. It is necessary that the walls of the casing be sufficiently thin so that the radiation being measured can penetrate the wall to ionize the gas contained within the casing.

Capacitor 12 is disposed at one end of the casing; one lead 15 of the capacitor is fitted through an appropriate bore in the casing and is soldered in place. The other lead 16 of capacitor 12 is cut short and is inserted through an opening in cap 17. Cap 17 is a thin member which is fitted snugly over one end of capacitor 12 and serves as one of the electrodes, or as the base for one of the electrodes of Ohmart cell 13. If high sensitivity is desired, and variance of the response with gamma energy is a secondary consideration, then lead 16 and cap 17 are joined by means of an excessive amount of solder 18 to provide a larger source of secondary electrons. If on the other hand a response independent of gamma energy is desired then the amount of solder is minimized and the electrode and casing material are chosen from those having an atomic weight less than thirty and preferably less than twenty. Preferably cap 17 is made of brass or some similar material so that it may be easily shaped to overfit the capacitor, and both the cap and solder 18 are plated with an electrode material 20, for example aluminum or magnesium. A strip of insulating material 21, such as Teflon, is disposed between the electrode material 20 and casing 11 to electrically insulate the electrode from the casing.

The second electrode of the Ohmart cell 13 is constituted by casing 11 or by a material coated or plated thereon such as colloidal graphite, a metal or a metallic oxide. The electrode associated with casing 11, and that associated with cap 17 should be constituted by dissimilar materials; in general, the further the materials are apart in the electromotive series, the higher the voltage which will be developed by the cell, and the wider the exposure range which can be covered by the dosimeter. An ionizable gas, such as air, nitrogen, helium, argon, or the like, is inserted through a piece of tubing 22 into space 23 in contact with both electrodes. Tube 22 is sealed as by soldering at 24 to close one end of the casing. The other end of casing 11 is sealed by means of Sylphon bellows 25 or some similar element. Bellows 25 are soldered or otherwise secured to an annular ring 26 which is in turn soldered to casing 11. A mounting plate 27 is joined to the inner end of bellows 25. This plate supports contact member 14, which consists of a piece of wire 28 inserted in a Kovar to glass or similar seal. Wire 28 has a capacitor contacting portion 30 disposed within space 23, and a meter engaging portion 31 disposed interiorly of bellows 25. It will be understood that the capacitor contacting portion 30 of the contact member need not physically contact the positive end of the capacitor, and in the preferred embodiment actually engages electrode 20. The important thing is that the portion 30 make electrical connection with the positive lead of the capacitor.

The bellows 25 are expandable so that contact member 14 which is normally spaced from electrode 20 and is consequently insulated therefrom, can be forced into engagement with the electrode to sample the charge on the capacitor. The bellows are constructed, however, so that in any position they cooperate with ring 26 and mounting plate 28 to form an air-tight seal for the gas within casing 11. Bellows 25 function to prevent the cell from being accidently shortcircuited by a piece of metal simultaneously contacting the casing and the positive capacitor lead. It can be seen that in order to shortcircuit the capacitor in the embodiment shown, not only would a piece of metal have to simultaneously engage the contact member 14 and the casing, but also sufficient force would have to be applied to the bellows to bring the contact member 14 into engagement with electrode 20.

In use, should an individual carrying a personal dosimeter be exposed to radiation, the radiation enters casing 11 and ionizes the filling gas in space 23, both directly and by means of secondary radiation from metallic components such as the electrodes and wells. A plasma of ions is thus formed within the space and there is a discriminatory migration of ions toward the electrodes associated with casing 11 and cap 17. Preferably, the electrode materials are selected so that the electrode associated with cap 17 is positive with respect to casing 11. As a general rule, this can be accomplished by making electrode 20 more noble than the electrode associated with the casing. Thus lead 16 of capacitor 12 is the positive lead, and lead 15 is grounded.

The size of the current generated by the Ohmart cell is a function of the amount of radiation to which the cell is subjected. This current flows through the external leakage path of the cell, including capacitor 12, charging up the capacitor to a potential which is a function of the current flow and consequently also a function of the amount of radiation to which the dosimeter has been exposed. Any time it is desired to determine the amount of exposure, the potential of capacitor 12 can be measured by depressing contact member 14 so that it is in electric contact with the capacitor and then connecting a suitable measuring device, such as an electrometer, across contact 14 and casing 11.

One type of reading device adapted for measuring the potential developed by a dosimeter is shown in Figure 4. The reading device, indicated generally at 35, includes a casing 36, a dial 37, which is preferably calibrated in units of quantity of radiation such as Roentgens, a dosimeter receiving well 38, a zero adjusting switch 40, a reading switch 41 and a shortcircuiting button 42, which controls a circuit for shorting the capacitor of the dosimeter to remove its charge and thereby recondition the dosimeter for further use.

The circuit diagram of a preferred embodiment of the reading device is shown in Figure 7. The elements constituting the dosimeter 10 are enclosed by the dotted line and include Ohmart cell 13 having a positive electrode 43 and a negative electrode 44, capacitor 12 shunting the electrodes and contact switch 45 constituted by bellows and contact member 14. The reading instrument 35 includes a grid control vacuum tube 46 having a plate 47, cathode 48 and grid 50. Grid 50 is connected through lead 51 to switch 45, and upon closure of that switch to the positive end of capacitor 12. Lead 51 is connected to ground through the parallel combination of resistance 52, grounding switch 53, located within well 38, and shorting switch 54.

The plate cathode circuit of tube 46 includes microammeter 55 which is connected across lines 56 and resistance 57 in line 58. Microammeter 55 is shunted by a variable calibrating resistance 60 and the series combination of range switch 61 and a variable resistance 62.

The range switch 61 is effective to change the potential required on grid 50 in order to obtain full scale deflection of the microammeter. When switch 61 is open, full scale deflection of the meter preferably corresponds to the largest quantity of radiation normally encountered. When the employees check their dosimeter at the end of each working day, full scale deflection should correspond to an amount of radiation of the order of 60 Roentgens. When switch 61 is closed, full scale deflection preferably corresponds to a very much larger quantity of radiation.

Lead 56 is connected through lead 63 and resistance 64 to the positive end of battery 65. Resistance 66 joins lead 58 to lead 63. The negative side of battery 65 is connected through lead 67, zero meter reading correction potentiometer 68 having grounded tap 70 to reading switch 71, and then to cathode 48. A conventional cathode heating circuit including switch 72 and battery 73 is provided for cathode 48 of tube 46.

One preferred form of dosimeter reading well is shown in Figures 5 and 6. Well 38 is secured to the casing 36 as at 74 and is of generally cylindrical configuration. The well includes a chamber 75 for receiving the bottom or skirt portion 76 of dosimeter 10, and is provided with an aperture 77 joining the chamber with the interior of the casing 36. Insulating member 78 and bushing 80, constructed of Teflon or some similar material, are inserted within aperture 77. A plunger 81 is reciprocally mounted within the bushing and is provided with a head 82 disposed within chamber 75. Plunger rod 83 is constructed of a conductive material and contains a bore 84 at the head end for receiving contact member 14.

The other end of rod 83 is preferably provided with a protuberance 85 which abuts arm 86. Arm 86 includes a grounding portion 87 which normally grounds the plunger to casing 36 as at 88. Lead 51 connects arm 86 to grid 50 of tube 46. As shown, arm 86 is mounted upon block 90 of insulating material which is in turn secured to the interior of casing 36. In the preferred embodiment arm 86 serves to spring urge the plunger upwardly, although some other spring means could be employed.

The inner surface of well 38 forming the periphery of chamber 75 constitutes a guiding surface for aligning the dosimeter when it is inserted into the well. As best shown from Figure 6, when a dosimeter is inserted into well 38 the skirt portion 76 of the dosimeter casing 11, extending substantially beyond contact member 14, cooperates with the guide surface to properly align the dosimeter for engagement with the plunger 81. The plunger engaging portion 31 of contact member 14 fits into opening 84 in the plunger rod making electrical contact therewith.

The relative stiffness of the spring arm 86 urging plunger 81 upwardly and bellows 25 must be such that arm 86 is displaced from grounding contact with the well before the bellows have expanded sufficiently to bring the contact member 14 into electrical connection with the capacitor 12. Thus, when the dosimeter is inserted into the well both the plunger and the contact member 14 are automatically grounded before a reading is made, thereby removing any stray charges which might otherwise seriously affect the accuracy of the reading. Then after the ground connection has been broken and the depression of the plunger is halted, either by the compression of a spring or, as shown by Figure 6, by engagement of head 82 with the bottom of the chamber, contact member 14 is forced into connection with the positive end of the capacitor 12. The potential of the capacitor is thereby applied through plunger 81, arm 86 and lead 51 to grid 50 of tube 46. After a reading has been made, button 42 is depressed, closing switch 54 to ground the positive side of the capacitor and remove its charge. The dosimeter is then conditioned ready for subsequent use.

As explained more fully in my copending application on "Method of Converting Ionic Energy Into Electrical Energy" when the voltage of an Ohmart cell rises above its critical value, the field bias is no longer effective to influence all of the ions produced. Consequently, the cell is not as sensitive to changes in intensity of the radioactive field as it is if operated below this critical point. Hence, it is desirable to provide a capacitor 12 of sufficiently large value that the voltage developed by the Ohmart cell never exceeds the critical value of the cell, which for this type of device may be as low as 40 or 50% of the cell's open circuit potential.

Preferably the capacitor is made of such a size that when the dosimeter is subjected to an amount of radiation substantially equal to the tolerance level (300 milli-roentgens per week or 50 milli-roentgens per day) the developed potential will not exceed more than 30% of the open circuit voltage of the cell. As a result the dosimeter will retain its maximum sensitivity into a range above the tolerance level and accurate determinations of radioactive exposure may be made throughout the entire range of exposures likely to be encountered.

Furthermore, the capacitor should be considerably larger, preferably of the order of one hundred times as large as the capacitance of the reading instrument. The reason for this latter requirement is that it is sometimes the case that the dosimeter when inserted in the meter is not properly read, or there is a question about the reading. In such cases, a second reading must be made. However, part of the capacitor charge is lost during the first reading so that the second reading will not be as accurate as the first. Since the portion of the charge which is lost is equal to the fraction formed by the ratio of the values of the capacitor and capacitance of the cell, the larger the capacitor relative to the instrument capacitance, the less difference which will exist between the first and subsequent readings. On the other hand, the size of capacitor 12 is preferably such that normal amounts of radiation will cause the Ohmart cell to generate sufficient current to drive the capacitor to a potential which can be readily measured.

Having described my invention, I claim:

1. A dosimeter comprising an outer casing having an open end and a closed end, a capacitor mounted within said casing adjacent to the closed end thereof, a radiant energy electric generator disposed within said casing, said radiant energy electric generator Ohmart cell including a positive electrode, a negative electrode electrically insulated from the positive electrode and constituted by a material chemically dissimilar from said positive electrode and a gas in contact with said electrodes, said negative electrode and one lead of said capacitor being in electrical connection with said casing, said positive electrode being connected to a second lead of said capacitor and insulated electrically from said casing, a movable contact member located within said casing at a point substantially removed from the open end thereof and disposed for selective electrical connection with said second lead of said capacitor.

2. A dosimeter comprising an outer casing, a capacitor mounted within said casing, a radiant energy electric generator disposed within said casing, said radiant energy electric generator including a positive electrode, a negative electrode electrically insulated from the positive electrode and constituted by a material chemically dissimilar from said electrode and a gas in contact with the electrodes, said electrodes being respectively connected to the leads of said capacitor whereby current generated by said cell is effective to build up a charge on said capacitor, said capacitor being of sufficient size whereby the current generated by the cell when exposed to a tolerance level or radiation does not develop a potential greater than 30% of the open circuit volatge of the cell.

3. A dosimeter comprising an outer casing, said casing having an open end and a closed end, a capacitor disposed interiorly of said casing at the closed end thereof, said capacitor having one lead connected to said casing and a second lead electrically insulated therefrom, a cap disposed over said capacitor adjacent said second lead, said cap being electrically insulated from said casing, a metallic coating applied to the interior of said casing substantially adjacent said cap, said cap and said metallic coating respectively comprising the positive and negative electrodes of a radiant energy electric generator, a gas in contact with said cap and said metallic coating, means for preventing the escape of gas through the open end of said casing, a movable contact member located within the open end of said casing and disposed for selective electrical connection with the second lead of said capacitor.

4. A personal dosimeter comprising an outer casing, said casing having an open end and closed end, a capacitor disposed interiorly of said casing, said capacitor having one lead connected to the casing and a second lead being electrically insulated therefrom, a cap disposed over said capacitor adjacent the second lead thereof, a metallic film disposed on said cap, a second metallic film disposed on the interior of said casing adjacent said cap, said metallic films respectively constituting the positive and negative electrodes of a radiant energy electric generator, a gas in contact with said electrodes, an expandable diaphragm spaced inwardly from the open end of said casing, said diaphragm being effective to prevent the escape of gas from said casing, a contact member mounted in said diaphragm in electrical insulation from said casing, said contact member being disposed for selective electrical connection with the positive lead when said diaphragm is expanded inwardly.

5. A dosimeter comprising an elongate outer casing, a capacitor mounted within said casing, a radiant energy electric generator disposed within said casing, said radiant energy electric generator including a positive electrode, a negative electrode electrically insulated from the positive electrode and constituted by a material chemically dissimilar from said positive electrode and a gas in contact with said electrodes, said negative electrode and one lead of said capacitor being in electrical connection with said casing, said positive electrode being connected to a second lead of said capacitor and insulated electrically from said casing, a movable contact member located within said casing and disposed for selective electrical selection with said second lead of said capacitor, said casing extending beyond the outer end of the contact member, thereby providing a skirt for protecting said contact member and aligning said dosimeter in a reading instrument.

6. A dosimeter comprising an outer casing, a capacitor mounted within said casing, a radiant energy electric generator disposed within said casing, said radiant energy electric generator including a positive electrode, a negative electrode electrically insulated from the positive electrode and constituted by a material chemically dissimilar from said electrode and a gas in contact with the electrodes, said electrodes being respectively connected to the leads of said capacitor whereby current generated by said radiant energy electric generator is effective to build up a charge on said capacitor, said capacitor being of sufficient size whereby the current generated by the generator when exposed to a tolerance level or radiation does not develop a potential exceeding the critical value of potential for said generator.

7. A dosimeter comprising an outer casing, said casing having an open end and a closed end, a capacitor disposed interiorly of said casing at the closed end thereof, said capacitor having one lead connected to said casing and a second lead electrically insulated therefrom, a cap disposed over said capacitor adjacent said second lead, said cap being electrically insulated from said casing, a metallic coating applied to the interior of said casing substantially adjacent said cap, a metallic coating applied to said cap, said coating on said cap being of a different material from the coating on said casing, the coating on said cap and casing respectively comprising the positive and negative electrodes of a radiant energy electric generator, a gas in contact with said electrodes, means for preventing the escape of gas through the open end of said casing, a movable contact member located within the open end of said casing and disposed for selective electrical connection with the second lead of said capacitor.

8. A dosimeter comprising an outer casing, said casing having an open end and a closed end, a capacitor disposed interiorly of said casing at the closed end thereof, said capacitor having one lead connected to said casing and a second lead electrically insulated therefrom, a cap disposed over said capacitor adjacent said second lead, said cap being electrically insulated from said casing, a metallic coating applied to the interior of said casing substantially adjacent said cap, a material coated on said cap, said material and said metallic coating respectively comprising the positive and negative electrodes of a radiant energy electric generator, a gas in contact with said cap and said metallic coating, means for preventing the escape of gas through the open end of said casing, a movable contact member located entirely within the open end of said casing and disposed for selective electrical connection with the second lead of said capacitor, resilient means normally maintaining said movable contact in spaced relationship with said second lead but permitting engagement of said contact and said lead upon application of sufficient force to said contact member.

9. A personal dosimeter comprising an outer casing, said casing having an open end and closed end, a capacitor disposed interiorly of said casing, said capacitor having one lead connected to the casing, and a second lead being electrically insulated therefrom, a cap disposed over said capacitor adjacent the second lead thereof, a metallic film disposed on said cap, a second metallic film disposed on the interior of said casing adjacent said cap, said metallic films respectively constituting the positive and negative electrodes of a radiant energy electric generator, a gas in contact with said electrodes, a Sylphon bellows disposed interiorly of said casing, one end of said bellows being secured to the open end of said casing whereby said diaphragm is effective to prevent the escape of gas from said casing, a contact member mounted at the other end of said bellows in electrical insulation from said casing, said contact member being disposed for selective electrical connection with the positive lead when said bellows are expanded inwardly.

10. In a reading device for dosimeters including a voltage measuring instrument, a dosimeter receiving well, said well comprising a member being configurated to form a chamber having an open end and adapted to telescopically receive a dosimeter, a plunger, said plunger being reciprocably mounted in said well and having a head disposed within said chamber, said plunger including an electrically conductive plunger rod, a conductor interconnecting said plunger rod and the voltage measuring instrument, spring means urging said plunger toward the open end of said chamber, said well member having a guide surface formed therein, said guide surface being adapted for cooperative engagement with the dosimeter to align said dosimeter for proper contact with the plunger, and a grounding contact associated with said plunger, said grounding contact normally connecting said plunger to ground but being effective to disconnect said plunger from ground when said plunger is depressed.

11. A reading device for converting a charge on a dosimeter into a visual indication of the quantity of radioactivity to which the dosimeter has been subjected, said reading device comprising a voltage measuring instrument, a dosimeter receiving well, said well having a contact movably mounted therein, said contact being adapted to engage the positive terminal of said dosimeter and being in electrical connection with said voltage measuring instrument, and switch means for shortcircuiting a dosimeter after the visual indication has been made.

12. A reading device for converting a charge on a dosimeter into a visual indication of the quantity of radioactivity to which the dosimeter has been subjected, said reading device comprising a voltage measuring instrument, a dosimeter receiving well, said well having a contact movably mounted therein, said contact being adapted to engage the positive terminal of said dosimeter and being in electrical connection with said voltage measuring instrument, and means for grounding said contact until it has been partially displaced by said dosimeter.

13. The combination of a dosimeter and a reading device for converting the charge on the dosimeter into a visual indication of the quantity of radioactivity to which the dosimeter has been subjected, said dosimeter comprising an outer casing, a capacitor mounted within said casing, a radiant energy electric generator disposed within said casing, said radiant energy electric generator including a positive electrode, a negative electrode and a gas in contact with the electrodes, said eletcrodes being respectively connected to the leads of said capacitor whereby current generated by said cell is effective to build up a charge on said capacitor, a movable contact member located within said casing and disposed for electrical connection with said second lead of said capacitor, resilient means normally maintaining the contact in spaced relationship with said second lead but permitting engagement of said contact member and said lead upon application of sufficient force to said contact member, said reading device comprising a voltage responsive indicator, a dosimeter receiving well, said well including a member configurated to form a chamber open at one end and adapted to telescopically receive said dosimeter, a plunger reciprocally mounted in said well and having a head disposed within said chamber, said plunger including an electrically conductive plunger rod adapted for electrical connection with said dosimeter contact, a conductor interconnecting said plunger rod and said voltage responsive indicator, spring means urging said plunger toward the open end of said chamber, a grounding contact associated with said plunger, said contact normally connecting said plunger to ground but being effective to disconnect said plunger from ground when said plunger is depressed, the resistance to displacement of said resilient means associated with said dosimeter being greater than the resistance to displacement of said spring means whereby said plunger is disconnected from ground before the dosimeter contact engages said capacitor lead.

14. The combination of a dosimeter and a reading device for converting the charge on the dosimeter into a visual indication of the quantity of radioactivity to which the dosimeter has been subjected, said dosimeter comprising an elongate outer casing, a capacitor mounted within said casing, a radiant energy electric generator disposed within said casing, said radiant energy electric generator including a positive electrode, a negative electrode electrically insulated from the positive electrode and constituted by a material chemically dissimilar from said positive electrode and a gas in contact with said electrodes, said negative electrode and one lead of said capacitor being in electrical connection with said casing, said positive electrode being connected to a second lead of said capacitor and insulated electrically from said casing, a movable contact member located within said casing and disposed for selective electrical connection with the second lead of said capacitor, said casing extending beyond the outer end of the contact member, thereby providing a skirt for protecting said contact member and aligning said dosimeter in the reading instrument, said reading device comprising a voltage measuring instrument, a dosimeter receiving well, said well having a contact movably mounted therein for engagement with said dosimeter contact member, said contact being in electrical connection with said voltage measuring instrument, said dosimeter receiving well having an aligning surface associated therewith for engagement with the skirt of said dosimeter to accurately position said dosimeter for engagement with said contact disposed within the dosimeter receiving well and thus prevent accidental shortcircuiting of the dosimeter.

References Cited in the file of this patent

UNITED STATES PATENTS

| | | |
|---|---|---|
| 2,545,386 | Rich | Mar. 13, 1951 |
| 2,546,048 | Test et al. | Mar. 20, 1951 |
| 2,536,991 | Wollan et al. | Jan. 2, 1952 |
| 2,582,163 | Rich et al. | Jan. 8, 1952 |
| 2,601,637 | Rose et al. | June 24, 1952 |
| 2,623,184 | Montgomery et al. | Dec. 23, 1952 |
| 2,630,535 | Landsverk | Mar. 3, 1953 |

OTHER REFERENCES

"A New Electronic Battery," from "The Electrician," vol. 10, page 497, Oct. 31, 1924.